US012590551B1

(12) United States Patent  
Alecu et al.

(10) Patent No.: US 12,590,551 B1  
(45) Date of Patent: Mar. 31, 2026

(54) OIL TANK RETURN FOR AN AIRCRAFT ENGINE OIL SYSTEM

(71) Applicant: Pratt & Whitney Canada Corp., Longueuil (CA)

(72) Inventors: Daniel Alecu, Ottawa (CA); Marion Daniel, Verdun (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/896,480

(22) Filed: Sep. 25, 2024

(51) Int. Cl.  
*F01M 11/00* (2006.01)  
*F02C 7/06* (2006.01)

(52) U.S. Cl.  
CPC ........... *F01M 11/0004* (2013.01); *F02C 7/06* (2013.01); *F01M 2011/0033* (2013.01); *F05D 2220/323* (2013.01); *F05D 2260/98* (2013.01)

(58) Field of Classification Search  
CPC ........ F01M 11/0004; F01M 2011/0033; F02C 7/06; F05D 2260/98; F05D 2220/32; F05D 2220/323  
See application file for complete search history.

(56) References Cited

U.S. PATENT DOCUMENTS

| | | | | |
|---|---|---|---|---|
| 7,618,482 B2 * | 11/2009 | Richards | ................. | F01M 11/00 |
| | | | | 96/208 |
| 8,181,746 B2 * | 5/2012 | Szolomayer | ......... | F01M 11/067 |
| | | | | 137/574 |

| | | | | |
|---|---|---|---|---|
| 8,479,486 B2 * | 7/2013 | Angst | ........................ | F02C 7/06 |
| | | | | 60/39.08 |
| 9,464,572 B2 * | 10/2016 | Cutrara | ..................... | F02C 7/06 |
| 9,650,957 B2 * | 5/2017 | Cutrara | .................... | F01M 1/00 |
| 10,301,969 B2 * | 5/2019 | Desjardins | ............... | F02C 7/06 |
| 10,514,107 B2 * | 12/2019 | Stachowiak | .......... | F01M 11/04 |
| 10,760,459 B2 * | 9/2020 | Foerster | ............. | F01M 11/0458 |
| 11,174,787 B2 * | 11/2021 | Reid | ......................... | F02C 7/06 |
| 11,236,672 B2 * | 2/2022 | Roberge | ................... | F01M 1/02 |
| 12,276,202 B2 * | 4/2025 | Bergeron | ............. | F01M 11/064 |
| 2008/0134657 A1 * | 6/2008 | DiBenedetto | ........... | F01D 9/065 |
| | | | | 60/39.08 |

(Continued)

FOREIGN PATENT DOCUMENTS

| | | |
|---|---|---|
| CN | 109441590 A | 3/2019 |
| CN | 112664292 A | 4/2021 |
| KR | 20180032227 A | 3/2018 |

OTHER PUBLICATIONS

EP search report for EP25204753.5 dated Feb. 13, 2026.

*Primary Examiner* — Henry Y Liu  
(74) *Attorney, Agent, or Firm* — Getz Balich LLC

(57) ABSTRACT

An engine oil system for an aircraft engine includes an oil tank and an oil tank return. The oil tank forms an internal oil cavity. The oil tank return forms a portion of an oil flow path through the engine oil system. The oil tank return includes a return body forming a return passage extending between and to a passage inlet and a passage outlet. The return body includes an inner diameter wall and an outer diameter wall. The inner diameter wall and the outer diameter wall form a turn of the return passage between the passage inlet and the passage outlet. The return body forms a top side, a corner, and an oblique side at the passage outlet. The corner and the oblique side are disposed at the outer diameter wall. The corner extends between the top side and the oblique side.

20 Claims, 6 Drawing Sheets

(56)         References Cited

U.S. PATENT DOCUMENTS

| | | | | |
|---|---|---|---|---|
| 2010/0122518 | A1* | 5/2010 | Angst | F02C 7/06 |
| | | | | 60/39.08 |
| 2014/0311155 | A1* | 10/2014 | Lewis | F02C 7/222 |
| | | | | 60/39.08 |
| 2015/0053505 | A1* | 2/2015 | Klowak | F01M 11/061 |
| | | | | 184/105.1 |
| 2015/0096839 | A1* | 4/2015 | Craig | F02C 7/06 |
| | | | | 184/6 |
| 2015/0176492 | A1* | 6/2015 | Cutrara | F01M 1/00 |
| | | | | 184/106 |
| 2018/0135463 | A1* | 5/2018 | Desjardins | F02C 7/06 |
| 2018/0355987 | A1* | 12/2018 | Stachowiak | F16K 15/044 |
| 2019/0338705 | A1* | 11/2019 | Reid | F16N 39/002 |
| 2019/0383217 | A1* | 12/2019 | Roberge | F02C 9/00 |
| 2021/0254548 | A1* | 8/2021 | Mcgrath | F01M 11/12 |
| 2022/0307397 | A1* | 9/2022 | Wall | F01M 11/0004 |
| 2022/0316361 | A1* | 10/2022 | Bergeron | F01M 11/064 |
| 2023/0021913 | A1* | 1/2023 | Levisse | F02C 3/067 |
| 2024/0001323 | A1* | 1/2024 | Ganiger | F02C 3/22 |
| 2024/0191635 | A1 | 6/2024 | Marcos Izquierdo | |
| 2025/0207511 | A1* | 6/2025 | Bergeron | F01M 11/064 |

* cited by examiner

20

OIL TANK RETURN FOR AN AIRCRAFT ENGINE OIL SYSTEM

TECHNICAL FIELD

This disclosure relates to engine oil systems for aircraft engines.

BACKGROUND OF THE ART

Engines for aircraft may typically include rotational equipment configured for facilitating aircraft propulsion, generating electrical power, and/or other functions of aircraft operation. In many cases, rotational equipment may require lubrication and/or cooling, for example, using one or more oil systems to distribute oil to the rotational equipment and/or other oil loads. Various engine oil systems are known in the art. While these known systems may be useful for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an engine oil system for an aircraft engine includes an oil tank and an oil tank return. The oil tank forms an internal oil cavity. The oil tank return forms a portion of an oil flow path through the engine oil system. The oil tank return includes a return body forming a return passage extending between and to a passage inlet and a passage outlet. The return body includes an inner diameter wall and an outer diameter wall. The inner diameter wall and the outer diameter wall form a turn of the return passage between the passage inlet and the passage outlet. The return body forms a top side, a corner, and an oblique side at the passage outlet. The corner and the oblique side are disposed at the outer diameter wall. The corner extends between the top side and the oblique side.

In any of the aspects or embodiments described above and herein, the oil tank may include a top wall forming a portion of the internal oil cavity and the top side may be disposed at the top wall.

In any of the aspects or embodiments described above and herein, the oil tank return may be disposed within the oil tank.

In any of the aspects or embodiments described above and herein, the oblique side may be oriented relative to the top side at an oblique angle, and the oblique angle may be between 30 degrees and 60 degrees.

In any of the aspects or embodiments described above and herein, the return body may further form an inner diameter side extending between and to the oblique side and the top side at the inner diameter wall.

In any of the aspects or embodiments described above and herein, the corner may have a first curvature radius, the inner diameter side may have a second curvature radius, and the second curvature radius may be greater than the first curvature radius.

In any of the aspects or embodiments described above and herein, the second curvature radius may be at least three times greater than the first curvature radius.

In any of the aspects or embodiments described above and herein, the corner and the inner diameter side may each have a circular arc shape.

In any of the aspects or embodiments described above and herein, the passage inlet may have an inlet axis, the passage outlet may have an outlet plane and an outlet axis orthogonal to the outlet plane, the turn may have a turn angle between the inlet axis and the outlet axis, and the turn angle may be greater than 60 degrees.

In any of the aspects or embodiments described above and herein, the passage inlet may have an inlet cross-sectional area, the passage outlet may have an outlet cross-sectional area, and the inlet cross-sectional area may be greater than the outlet cross-sectional area.

According to another aspect of the present disclosure, an engine oil system for an aircraft engine includes an oil tank and an oil tank return. The oil tank includes a sidewall and a top wall. The sidewall and the top wall form an internal oil cavity. The oil tank return forms a portion of an oil flow path through the engine oil system. The oil tank return includes a return body. The return body is disposed at the top wall. The return body forms a return passage extending between and to a passage inlet and a passage outlet. The return body includes an inner diameter wall and an outer diameter wall. The inner diameter wall and the outer diameter wall form a turn of the return passage between the passage inlet and the passage outlet. The return body forms a corner and an inner diameter side at the passage outlet. The corner is disposed at the outer diameter wall. The corner has a first curvature radius. The inner diameter side is disposed at the inner diameter wall. The inner diameter side has a second curvature radius. The second curvature radius is greater than the first curvature radius.

In any of the aspects or embodiments described above and herein, the return body may further form a top side at the passage outlet the top side may extend between and to the corner and the inner diameter side, and the top side may be substantially parallel to the top wall.

In any of the aspects or embodiments described above and herein, the return body may further form an oblique side at the passage outlet, the oblique side may extend between and to the corner and the inner diameter side, the oblique side may be oriented at an oblique angle relative to the top side, and the oblique angle may be greater than 30 degrees.

In any of the aspects or embodiments described above and herein, the passage inlet may have an inlet axis, the passage outlet may have an outlet plane and an outlet axis orthogonal to the outlet plane, the turn may have a turn angle between the inlet axis and the outlet axis, and the turn angle may be greater than 60 degrees.

In any of the aspects or embodiments described above and herein, the passage inlet may have an inlet cross-sectional area, the passage outlet may have an outlet cross-sectional area, and the inlet cross-sectional area may be greater than the outlet cross-sectional area.

According to another aspect of the present disclosure, an engine oil system for an aircraft engine includes an oil tank and an oil tank return. The oil tank includes a sidewall and a top wall. The sidewall and the top wall form an internal oil cavity. The oil tank return forms a portion of an oil flow path through the engine oil system. The oil tank return includes a return body forming a return passage extending between and to a passage inlet and a passage outlet. The passage inlet has an inlet axis. The passage outlet has an outlet plane and an outlet axis orthogonal to the outlet plane. The return body includes an inner diameter wall and an outer diameter wall. The inner diameter wall and the outer diameter wall form a turn of the return passage between the passage inlet and the passage outlet. The turn has a turn angle between the inlet axis and the outlet axis. The turn angle is greater than 60 degrees. The return body forms a top side and a corner at the passage outlet. The corner is disposed at the top wall.

In any of the aspects or embodiments described above and herein, the return body may further form an inner diameter side at the inner diameter wall, the corner may have a first curvature radius, the inner diameter side may have a second curvature radius, and the second curvature radius may be greater than the first curvature radius.

In any of the aspects or embodiments described above and herein, the second curvature radius may be at least three times greater than the first curvature radius.

In any of the aspects or embodiments described above and herein, the corner and the inner diameter side may each have a circular arc shape.

In any of the aspects or embodiments described above and herein, the corner may be formed by the outer diameter wall and the inner diameter side may be formed by the inner diameter wall.

The present disclosure, and all its aspects, embodiments and advantages associated therewith will become more readily apparent in view of the detailed description provided below, including the accompanying drawings.

DETAILED DESCRIPTION

Figure 1:
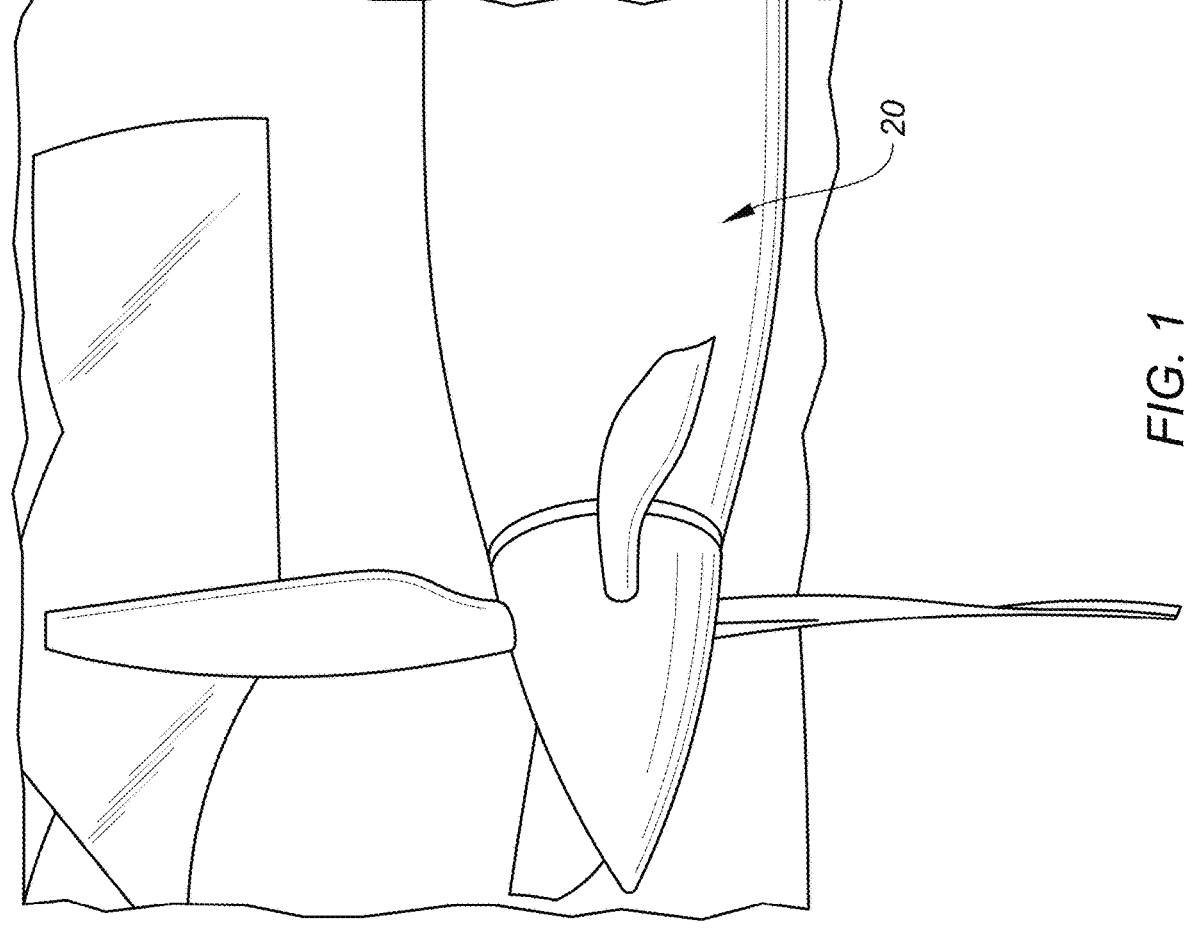
FIG. 1 illustrates a perspective view of an aircraft including a propulsion system, in accordance with one or more embodiments of the present disclosure.

FIG. 1 illustrates a propulsion system 20 for an aircraft. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
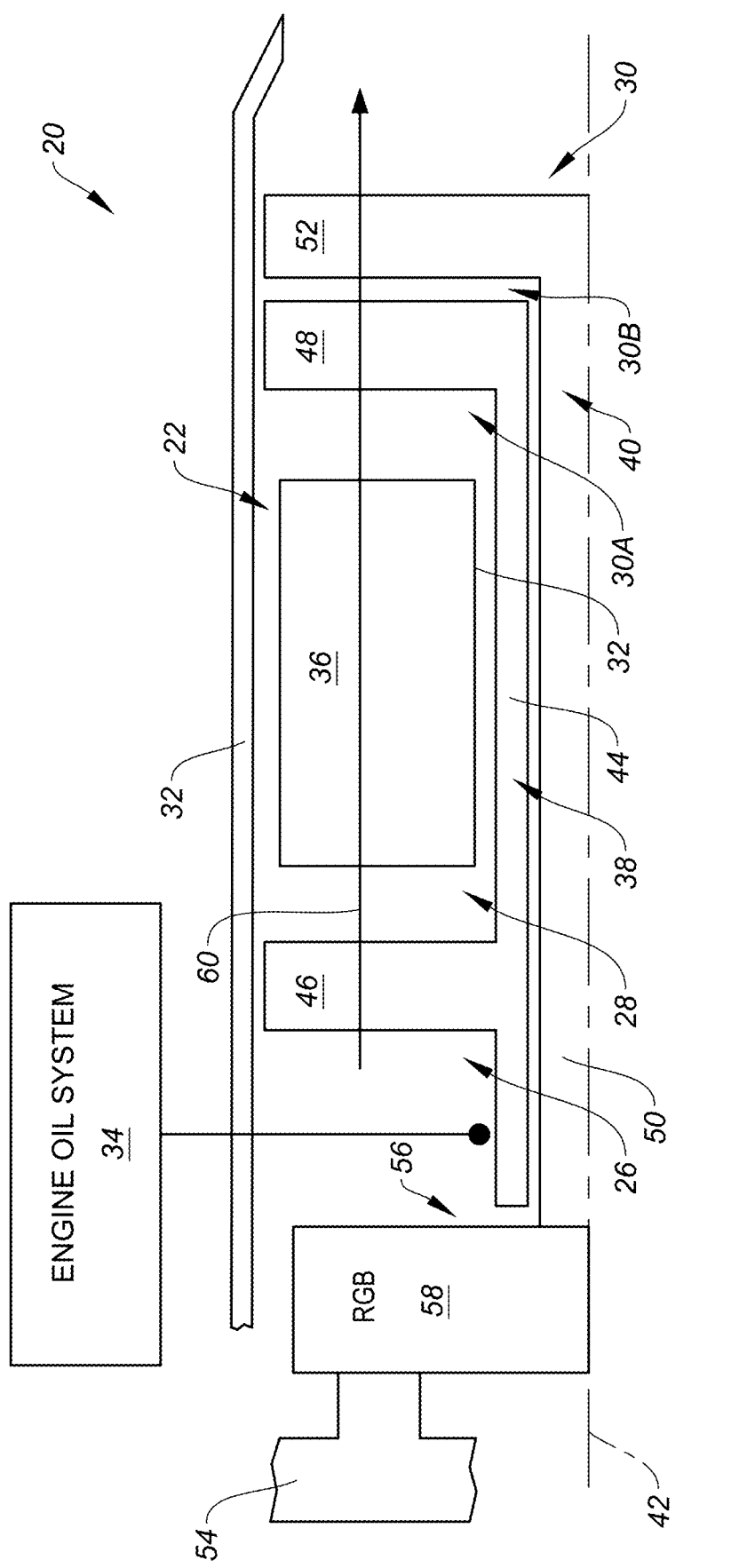
FIG. 2 schematically illustrates a cutaway, side view of an aircraft propulsion system including a gas turbine engine, in accordance with one or more embodiments of the present disclosure.

FIG. 2 schematically illustrates a cutaway, side view of the propulsion system 20. The propulsion system 20 of FIG. 2 includes a gas turbine engine 22. The gas turbine engine 22 of FIG. 2 is configured as a turboprop gas turbine engine. However, while the following description and accompanying drawings may refer to the turboprop gas turbine engine 22 of FIG. 2 as an example, it should be understood that aspects of the present disclosure may be equally applicable to other types of gas turbine engines including, but not limited to, a turboshaft gas turbine engine, a turbofan gas turbine engine, a turbojet gas turbine engine, a propfan gas turbine engine, or an open rotor gas turbine engine. Aspects of the present disclosure may be equally applicable to aircraft propulsion systems including other engine configurations such as, but not limited to, rotary engines, piston engines, and the like, or to electric aircraft propulsion systems (e.g., battery-electric propulsion systems, fuel-cell-electric propulsion systems, etc.). Aspects of the present disclosure may also be equally applicable to aircraft engines which are not part of a propulsion system, for example, an engine for an auxiliary power unit (APU).

The gas turbine engine 22 of FIG. 2 includes a compressor section 26, a combustor section 28, a turbine section 30, an engine static structure 32, and an engine oil system 34. The combustor section 28 includes a combustor 36 (e.g., an annular combustor). The turbine section 30 of FIG. 2 includes a high-pressure turbine (HPT) section 30A and a low-pressure turbine (LPT) section 30B.

Components of the compressor section 26 and/or the turbine section 30 form a first rotational assembly 38 (e.g., a high-pressure spool) and a second rotational assembly 40 of the gas turbine engine 22. The first rotational assembly 38 and the second rotational assembly 40 are mounted for rotation about a rotational axis 42 (e.g., an axial centerline) of the gas turbine engine 22 relative to the engine static structure 32.

The first rotational assembly 38 includes a first shaft 44, a bladed compressor rotor 46 for the compressor section 26, and a bladed first turbine rotor 48 for the high-pressure turbine section 30A. The first shaft 44 interconnects the bladed first compressor rotor 46 and the bladed first turbine rotor 48.

The second rotational assembly 40 includes a second shaft 50 and a bladed second turbine rotor 52 (e.g., a power turbine rotor) for the low-pressure turbine section 30B. The second shaft 50 is connected to the bladed second turbine rotor 52. The second shaft 50 couples the bladed second turbine rotor 52 with a propulsor 54 (e.g., a propeller) of the propulsor system 20. The second shaft 50 of FIG. 2 is coupled to the propulsor 54 by a gear train 56. For example, the gear train 56 of FIG. 2 includes a reduction gear box (RGB) 58 including a gear assembly (e.g., an epicyclic gear assembly) configured to drive the propulsor 54 at a reduced rotational speed relative to the second shaft 50. Alternatively, the second shaft 50 may be directed coupled to the propulsor 54 to drive the propulsor 54 at a same rotational speed as the second shaft 50.

The engine static structure 32 includes one or more engine cases, cowlings, inner fixed structures, and/or other non-rotating structures configured to house and/or support components of the gas turbine engine sections 26, 28, 30. The engine static structure 32 further includes one or more bearing assemblies configured to rotationally support components of the first rotational assembly 38 and the second rotational assembly 40.

In operation of the gas turbine engine 22, ambient air is directed into (e.g., from an air intake) and through the compressor section 26 along a core flow path 60. Air flow along the core flow path 60 is compressed in the compressor section 26, mixed and burned with fuel in the combustor 36, and the resultant combustion gas is directed through the high-pressure turbine section 30A and the low-pressure turbine section 30B. The bladed first turbine rotor 48 and the bladed second turbine rotor 52 rotationally drive the first rotational assembly 38 and the second rotational assembly 40, respectively, in response to the combustion gas flow through the high-pressure turbine section 30A and the low-pressure turbine section 30B. The second rotational assembly 40 drives rotation of the propulsor 54 to generate thrust for the propulsion system 20.

Figure 3:
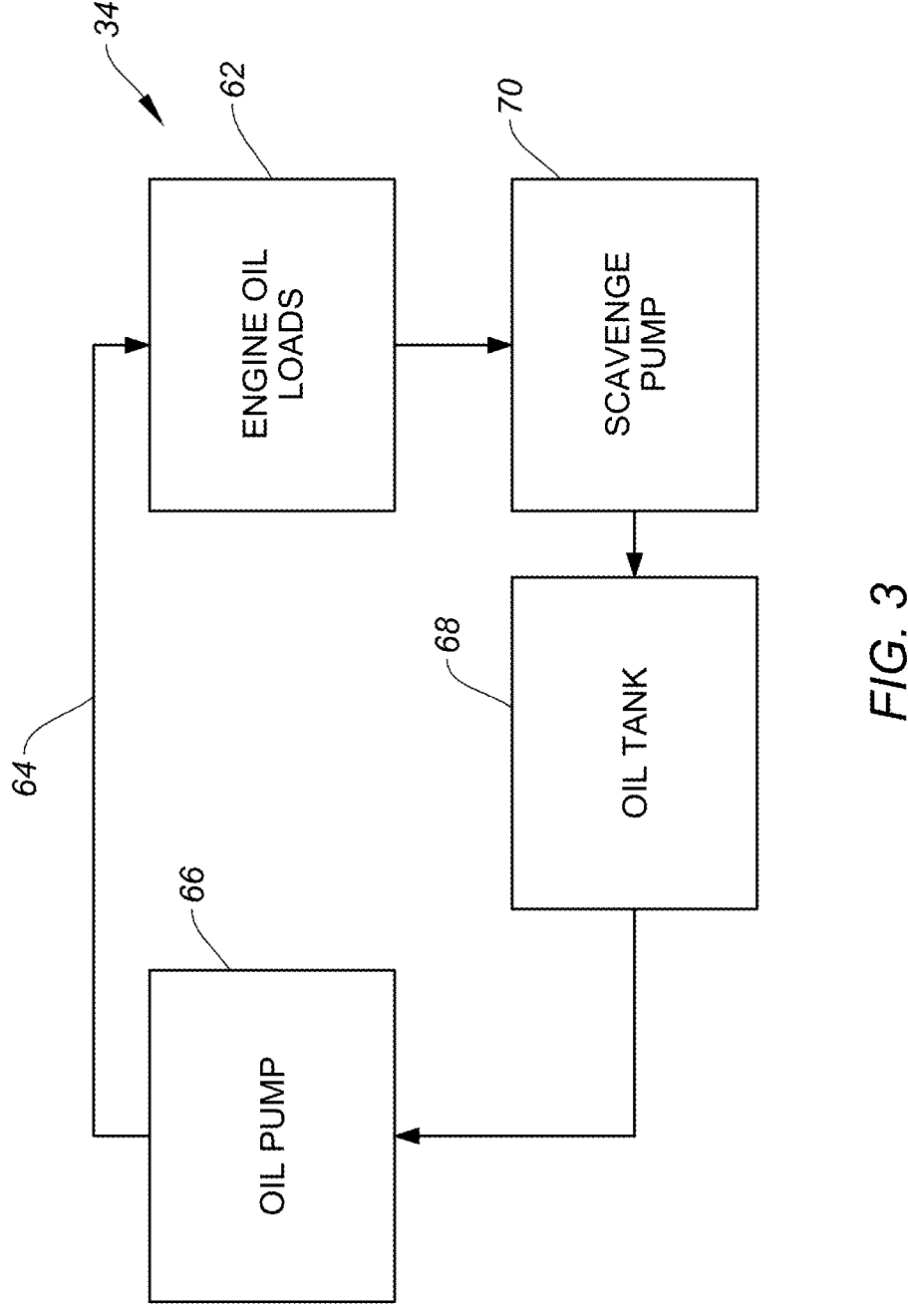
FIG. 3 schematically illustrates an engine oil system for an aircraft propulsion system, in accordance with one or more embodiments of the present disclosure.

Referring to FIG. 3, the engine oil system 34 is configured to facilitate lubrication and/or cooling for components of the propulsion system 20 and its gas turbine engine 22. FIG. 3 schematically illustrates the engine oil system 34. The present disclosure is not limited to the foregoing exemplary configuration of the engine oil system 34 of FIG. 3, and the engine oil system 34 may include additional and/or alternative oil system components (e.g., tanks, valves, heat exchangers, pumps, conduits, regulators, etc.) suitable for facilitating lubrication and/or cooling for components of the propulsion system 20 and its gas turbine engine 22, referred to herein as engine oil loads 62. The engine oil loads 62 may include, but are not limited to, bearing assemblies, gear train 56 components (e.g., the reduction gear box 58), shafts (e.g., the first shaft 44 and the second shaft 50), and the like.

The engine oil system 34 includes an oil flow path 64, an oil pump 66, and an oil tank 68. The engine oil system 34 may additionally include one or more scavenge pumps 70. The oil pump 66 is configured to circulate oil from the oil tank 68 along the oil flow path 64 to direct (e.g., pump) the oil to the engine oil loads 62 for lubrication and/or cooling of the engine oil loads 62. Oil from the engine oil loads 62 is directed to return to the oil tank 68. For example, the scavenge pump 70 may operate to direct (e.g., pump) oil from one or more of the engine oil loads 62, or an oil sump downstream of the engine oil loads 62, to the oil tank 68.

Figure 4:
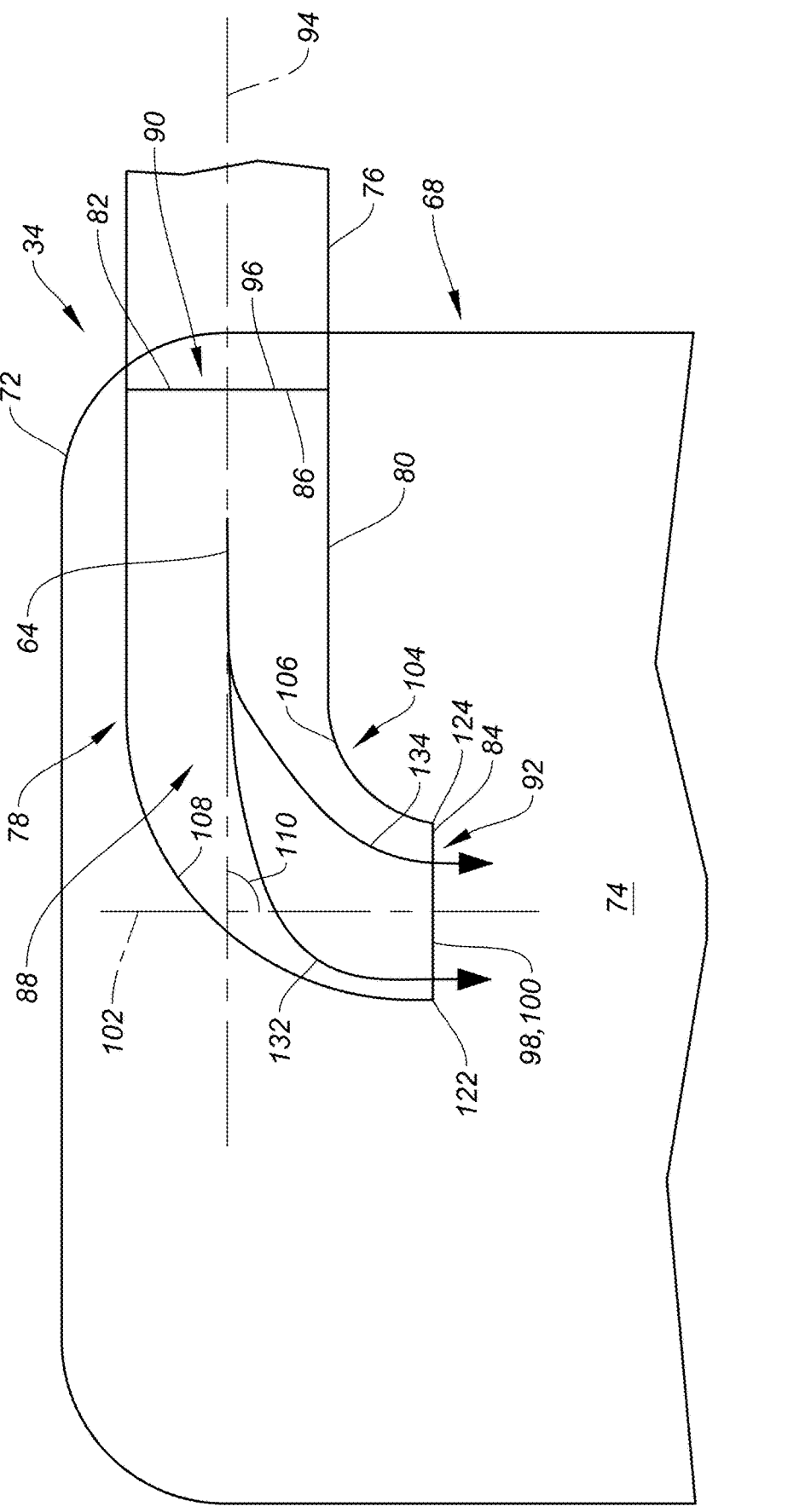
FIG. 4 schematically illustrates a top view of an oil tank and an oil tank return for an engine oil system, in accordance with one or more embodiments of the present disclosure.

FIG. 4 schematically illustrates a top view of the engine oil system 34 at the oil tank 68. The oil tank 68 of FIG. 4 includes a sidewall 72 forming a portion of an internal oil cavity 74 of the oil tank 68. The engine oil system 34 further includes a conduit 76 and an oil tank return 78. The conduit 76 and the oil tank return 78 form a portion of the oil flow path 64, for example, between the oil tank 68 and the scavenge pumps 70.

The oil tank return 78 includes a return body 80. The return body 80 of FIG. 4 is disposed within the oil tank 68 (e.g., entirely within the oil tank 68). For example, the return body 80 may be mounted to the oil tank 68 within the internal oil cavity 74. However, the return body 80 may alternatively be disposed outside of the oil tank 68 and connected in fluid communication with the internal oil cavity 74 (e.g., at the sidewall 72). The return body 80 extends between and to an inlet end 82 of the return body 80 and an outlet end 84 of the return body 80. The inlet end 82 is mounted to or otherwise disposed at (e.g., on, adjacent, or proximate) a distal end 86 of the conduit 76. The return body 80 forms and circumscribes a return passage 88 of the oil tank return 78 from the inlet end 82 to the outlet end 84. The return passage 88 forms the oil flow path 64 through the oil tank return 78. The return passage 88 extends between and to a passage inlet 90 (e.g., at the inlet end 82) and a passage outlet 92 (e.g., at the outlet end 84). The passage outlet 92 is connected in fluid communication with the internal oil cavity 74.

The passage inlet 90 has an inlet axis 94 (e.g., a centerline axis) and an inlet cross-sectional area 96 extending, for example, along a plane orthogonal to the inlet axis 94. The inlet end 82 may form a circular or substantially circular shape of the inlet cross-sectional area 96 (e.g., centered about the inlet axis 94), however, the present disclosure is not limited to any particular cross-sectional shape of the passage inlet 90. The outlet end 84 forms an outlet plane 98 of the passage outlet 92. The passage outlet 92 has an outlet cross-sectional area 100 on the outlet plane 98. The passage outlet 92 has an outlet axis 102 orthogonal to outlet plane 98.

The inlet cross-sectional area 96 may be greater than the outlet cross-sectional area 100, for example, to facilitate sufficient acceleration of oil through the return passage 88 and into the internal oil cavity 74, as will be discussed in further detail. For example, the outlet cross-sectional area 100 may be less than about 90 percent of the inlet cross-sectional area 96.

The return body 80 forms a turn 104 of the return passage 88 between the passage inlet 90 and the passage outlet 92. The turn 104 is formed by and between an inner diameter wall 106 and an outer diameter wall 108 of the return body 80. The turn 104 may be characterized, for example, by a turn angle 110 between the inlet axis 94 and the outlet axis 102. The turn angle 110 may be between about 60 degrees and about 90 degrees to facilitate suitable separation of oil and air within the turn 104, as will be discussed in further detail.

Figure 5:
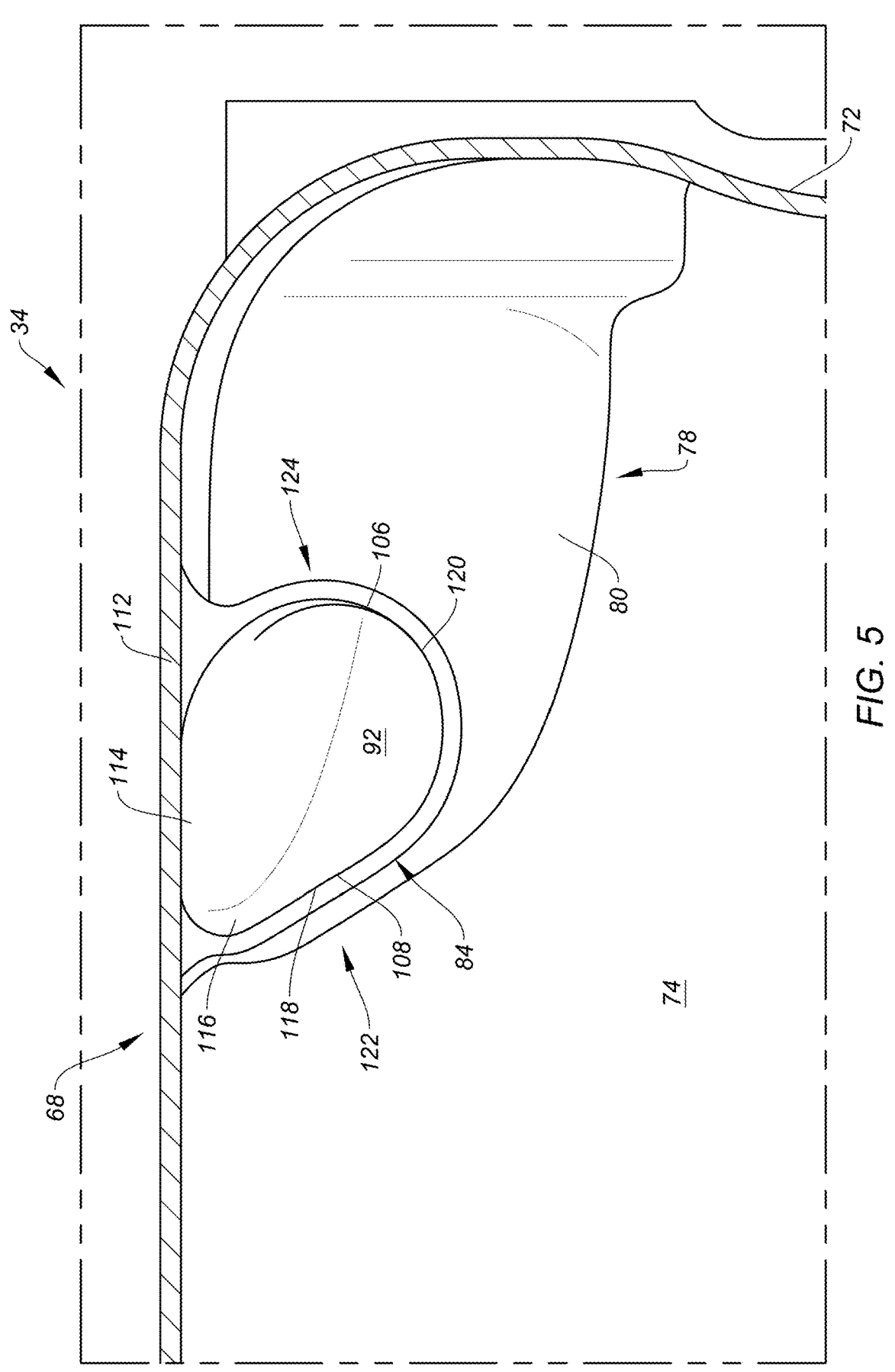
FIG. 5 illustrates a side view of the oil tank return within the oil tank, in accordance with one or more embodiments of the present disclosure.
Figure 6:
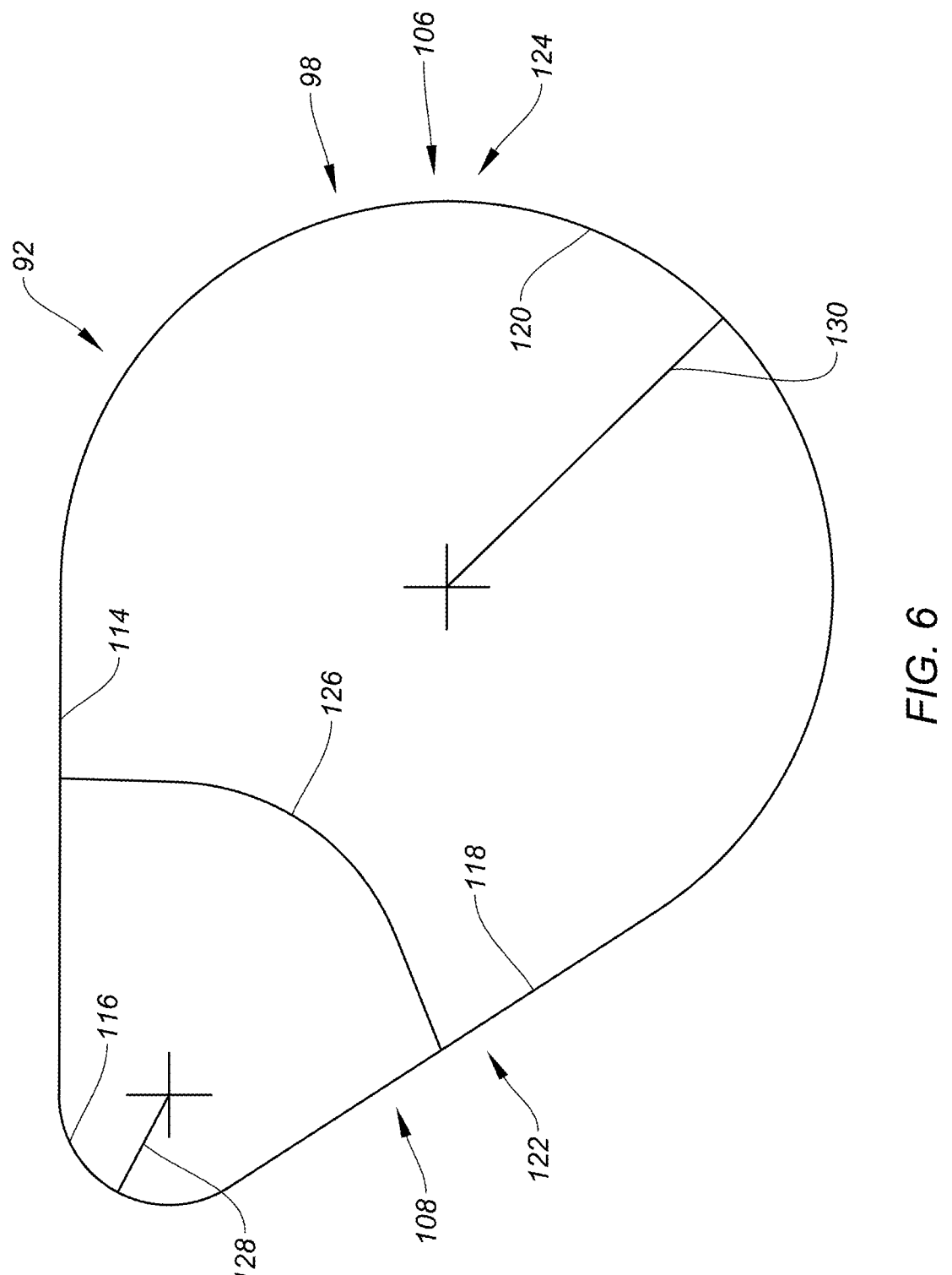
FIG. 6 schematically illustrates a passage outlet of the oil tank return, in accordance with one or more embodiments of the present disclosure.

FIG. 5 illustrates a cutaway, side view of the oil tank return 78 and the oil tank 68 showing the passage outlet 92. FIG. 6 schematically illustrates the passage outlet 92 along the outlet plane 98. The passage outlet 92 is disposed at (e.g., on, adjacent, or proximate) a top wall 112 (e.g., a vertically top wall) of the oil tank 68.

The return body 80 forms the passage outlet 92 (e.g., pear-shaped passage outlet) on the outlet end 84 with a top side 114, a corner 116, an oblique side 118, and an inner diameter side 120 at (e.g., on, adjacent, or proximate) the passage outlet 92 and forming a perimeter of the passage outlet 92. The passage outlet 92 extends between an outer diameter end 122 formed by the outer diameter wall 108 and an inner diameter end 124 formed by the inner diameter wall 108. The top side 114 is disposed at (e.g., on, adjacent, or proximate) the top wall 112. The top side 114 may extend parallel to or substantially parallel to the top wall 112. The corner 116 is disposed on the outer diameter end 122 along the outer diameter wall 108. The corner 116 extends between and to the top side 114 and the oblique side 118. The corner 116 may have, for example, a circular arc shape, a V-shape, or the like extending between and to the top side 114 and the oblique side 118. The oblique side 118 is disposed on the outer diameter end 122 along the outer diameter wall 108. The oblique side 118 extends along the outer diameter end 122 between and to (e.g., straight between and to) the corner 116 and the inner diameter side 120. The oblique side 118 is oriented relative to the top side 114 by an oblique angle 126 on the outlet plane 98. The oblique angle 126 may be between about 30 degrees and about 60 degrees to facilitate suitable acceleration of oil into the corner 116 and out of the oil tank return 78. The inner diameter side 120 is disposed, at least in part, on the inner diameter end 124. The inner diameter side 120 extends between and to the oblique side 118 and the top side 114. The inner diameter side 120 may have, for example, a circular arc shape or the like extending between and to the oblique side 118 and the top side 114.

The return body 80 may form the corner 116 and the inner diameter side 120 such that the corner 116 may have a curvature radius 128 which is smaller than a curvature radius 130 of the inner diameter side 120. For example, the curvature radius 130 of the inner diameter side 120 may be greater than two times the curvature radius 128 of the corner 116, or greater than three times the curvature radius 128 of the corner 116.

During operation of the gas turbine engine 22 and its engine oil system 34, air and oil may become mixed at points along the oil flow path 64 such as, but not limited to, within the engine oil loads 62 (e.g., bearing compartment cavities). This oil entrained with air is returned to the oil tank 68, for example, by the scavenge pumps 70. Conventionally, the oil and air may gradually become separated while resting in an oil tank, however, this conventional design practice may reduce the quantity of oil which is available for lubrication and cooling of engine components. As shown in FIG. 4, the present disclosure engine oil system 34 directs oil 132 into the oil tank 68 (e.g., the internal oil cavity 74) through the oil tank return 78. As the oil transits the turn 104, the oil 132 flows along the outer diameter wall 108 and air 134 is circumferentially separated from the oil 132. As a result of the curvature of the turn 104 and the orientation of the oblique side 118 at the outer diameter wall 108, the oil 132 is accelerated into the corner 116 where the oil 132 is directed out of the oil tank return 78. The oil 132 directed out of the oil tank return 78 from the corner 116 may be directed onto and along the top wall 112 where the oil 132 may subsequently lose energy, fall, and collect within the internal oil cavity 74. The air 134 may be directed out of the passage outlet 92 along the inner diameter side 120. The separation of the air 134 from the oil 132 within the oil tank return 78 may additionally prevent or reduce the likelihood or severity of foaming of the oil 132, which can result where air remains trapped within the oil 132.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An engine oil system for an aircraft engine, the engine oil system comprising:
   an oil tank forming an internal oil cavity; and
   an oil tank return forming a portion of an oil flow path through the engine oil system, the oil tank return including a return body forming a return passage extending between and to a passage inlet and a passage outlet, the return body including an inner diameter wall and an outer diameter wall, the inner diameter wall and the outer diameter wall forming a turn of the return passage between the passage inlet and the passage outlet, the return body forming a top side, a corner, and an oblique side at the passage outlet, the corner and the oblique side disposed at the outer diameter wall, the corner extending between the top side and the oblique side.

2. The engine oil system of claim 1, wherein the oil tank includes a top wall forming a portion of the internal oil cavity, and the top side is disposed at the top wall.

3. The engine oil system of claim 1, wherein the oil tank return is disposed within the oil tank.

4. The engine oil system of claim 1, wherein the oblique side is oriented relative to the top side at an oblique angle, and the oblique angle is between 30 degrees and 60 degrees.

5. The engine oil system of claim 1, wherein the return body further forms an inner diameter side extending between and to the oblique side and the top side at the inner diameter wall.

6. The engine oil system of claim 5, wherein the corner has a first curvature radius, the inner diameter side has a second curvature radius, and the second curvature radius is greater than the first curvature radius.

7. The engine oil system of claim 6, wherein the second curvature radius is at least three times greater than the first curvature radius.

8. The engine oil system of claim 6, wherein the corner and the inner diameter side each have a circular arc shape.

9. The engine oil system of claim 1, wherein the passage inlet has an inlet axis, the passage outlet has an outlet plane and an outlet axis orthogonal to the outlet plane, the turn has a turn angle between the inlet axis and the outlet axis, and the turn angle is greater than 60 degrees.

10. The engine oil system of claim 1, wherein the passage inlet has an inlet cross-sectional area, the passage outlet has an outlet cross-sectional area, and the inlet cross-sectional area is greater than the outlet cross-sectional area.

11. An engine oil system for an aircraft engine, the engine oil system comprising:

an oil tank including a sidewall and a top wall, the sidewall and the top wall forming an internal oil cavity; and an oil tank return forming a portion of an oil flow path through the engine oil system, the oil tank return including a return body, the return body disposed at the top wall, the return body forming a return passage extending between and to a passage inlet and a passage outlet, the return body including an inner diameter wall and an outer diameter wall, the inner diameter wall and the outer diameter wall forming a turn of the return passage between the passage inlet and the passage outlet, the return body forming a corner and an inner diameter side at the passage outlet, the corner disposed at the outer diameter wall, the corner having a first curvature radius, the inner diameter side disposed at the inner diameter wall, the inner diameter side having a second curvature radius, the second curvature radius greater than the first curvature radius.

12. The engine oil system of claim 11, wherein the return body further forms a top side at the passage outlet, the top side extends between and to the corner and the inner diameter side, and the top side is substantially parallel to the top wall.

13. The engine oil system of claim 12, wherein the return body further forms an oblique side at the passage outlet, the oblique side extends between and to the corner and the inner diameter side, the oblique side is oriented at an oblique angle relative to the top side, and the oblique angle is greater than 30 degrees.

14. The engine oil system of claim 11, wherein the passage inlet has an inlet axis, the passage outlet has an outlet plane and an outlet axis orthogonal to the outlet plane, the turn has a turn angle between the inlet axis and the outlet axis, and the turn angle is greater than 60 degrees.

15. The engine oil system of claim 1, wherein the passage inlet has an inlet cross-sectional area, the passage outlet has an outlet cross-sectional area, and the inlet cross-sectional area is greater than the outlet cross-sectional area.

16. An engine oil system for an aircraft engine, the engine oil system comprising:

an oil tank including a sidewall and a top wall, the sidewall and the top wall forming an internal oil cavity; and an oil tank return forming a portion of an oil flow path through the engine oil system, the oil tank return including a return body forming a return passage extending between and to a passage inlet and a passage outlet, the passage inlet having an inlet axis, the passage outlet having an outlet plane and an outlet axis orthogonal to the outlet plane, the return body including an inner diameter wall and an outer diameter wall, the inner diameter wall and the outer diameter wall forming a turn of the return passage between the passage inlet and the passage outlet, the turn having a turn angle between the inlet axis and the outlet axis, the turn angle greater than 60 degrees, the return body forming a top side a corner at the passage outlet, the corner disposed at the top wall.

17. The engine oil system of claim 16, wherein the return body further forms an inner diameter side at the inner diameter wall, the corner has a first curvature radius, the inner diameter side has a second curvature radius, and the second curvature radius is greater than the first curvature radius.

18. The engine oil system of claim 17, wherein the second curvature radius is at least three times greater than the first curvature radius.

19. The engine oil system of claim 17, wherein the corner and the inner diameter side each have a circular arc shape.

20. The engine oil system of claim 17, wherein the corner is formed by the outer diameter wall and the inner diameter side is formed by the inner diameter wall.

* * * * *